United States Patent [19]

Fair et al.

[11] Patent Number: 4,715,558
[45] Date of Patent: Dec. 29, 1987

[54] SINGLE PIECE TAPE REEL AND ASSEMBLY

[75] Inventors: Kenneth E. Fair; Charles M. Campbell, both of Opelika, Ala.

[73] Assignee: Ampex Corporation, Redwood City, Calif.

[21] Appl. No.: 832,927

[22] Filed: Feb. 24, 1986

[51] Int. Cl.[4] .......................... G03B 1/04; B65H 75/18
[52] U.S. Cl. .................................... 242/199; 242/71.8; 242/179
[58] Field of Search ...................... 242/179, 197, 71.8, 242/199, 206; 360/132, 134

[56] References Cited

U.S. PATENT DOCUMENTS

| | | | |
|---|---|---|---|
| Re. 27,584 | 2/1973 | Cousino | 242/55.19 A |
| 3,486,709 | 12/1969 | Roberson | 242/71.8 |
| 3,617,010 | 11/1971 | Coy | 242/55.19 A |
| 3,752,113 | 8/1973 | Blichman | 242/74 |
| 3,831,881 | 8/1974 | Tucker | 242/197 X |
| 3,857,531 | 12/1974 | Jantzen | 242/197 |
| 3,861,611 | 1/1975 | Esashi et al. | 242/55.19 A |
| 3,905,561 | 9/1975 | Kelch | 242/71.8 |
| 3,940,799 | 2/1976 | Matsumoto et al. | 360/132 |
| 3,982,701 | 9/1976 | Courtney et al. | 242/55.19 A |
| 4,234,137 | 11/1980 | Watanabe | 242/71.8 |
| 4,473,194 | 9/1984 | Kashimura | 242/71.8 |
| 4,473,198 | 9/1984 | Pertzsch | 242/197 |
| 4,564,156 | 1/1986 | Cybulski | 242/197 |
| 4,606,,511 | 8/1986 | Machida | 242/71.8 |

FOREIGN PATENT DOCUMENTS 2099399 12/1982 United Kingdom ................ 242/179

*Primary Examiner*—Stuart S. Levy
*Assistant Examiner*—Katherine A. Matecki
*Attorney, Agent, or Firm*—Harry G. Thibault; Joel D. Talcott; Richard P. Lange

[57] ABSTRACT

A single piece tape reel and assembly which combines a hub portion, a bottom flange and a top bearing cover into a one-piece member of substantially improved rotational stability.

12 Claims, 10 Drawing Figures

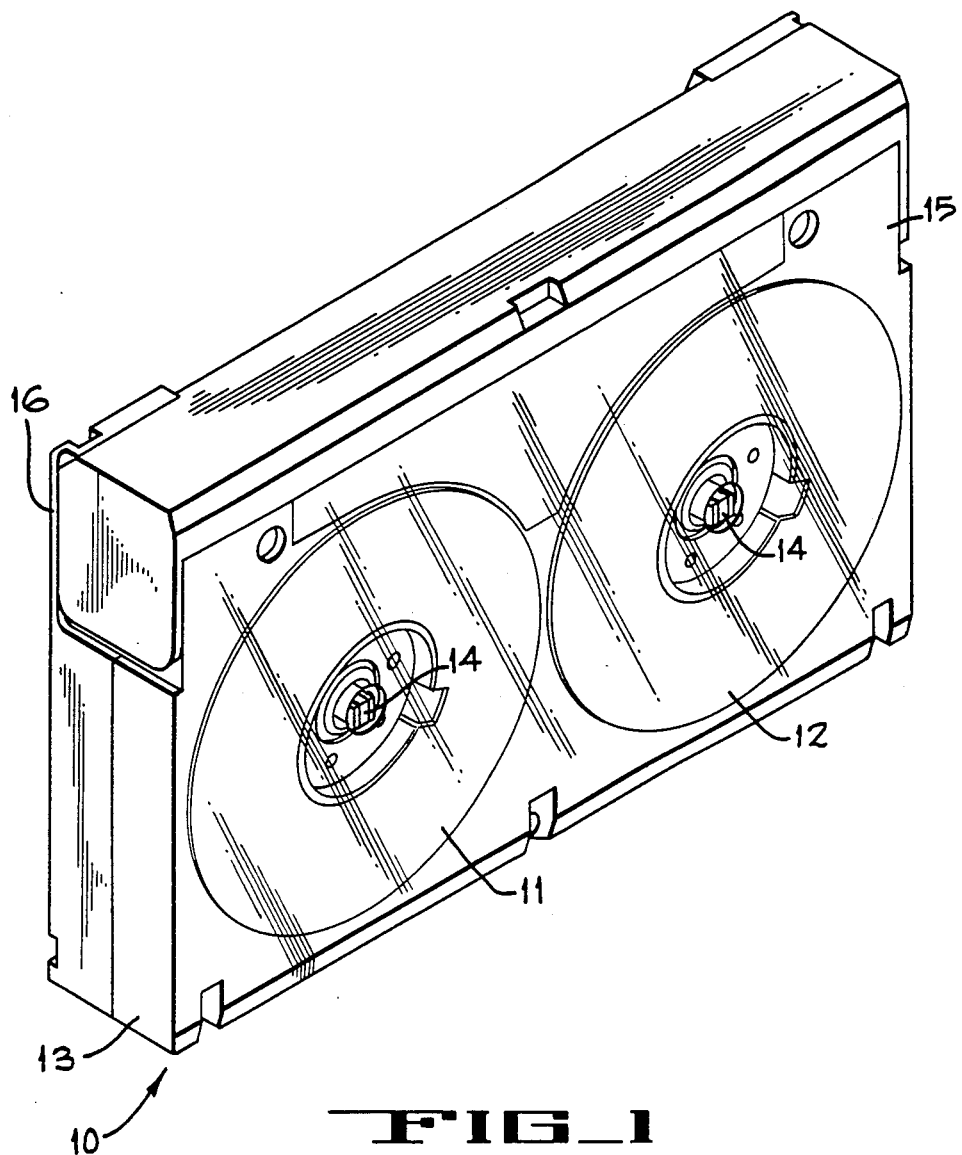
FIG_1

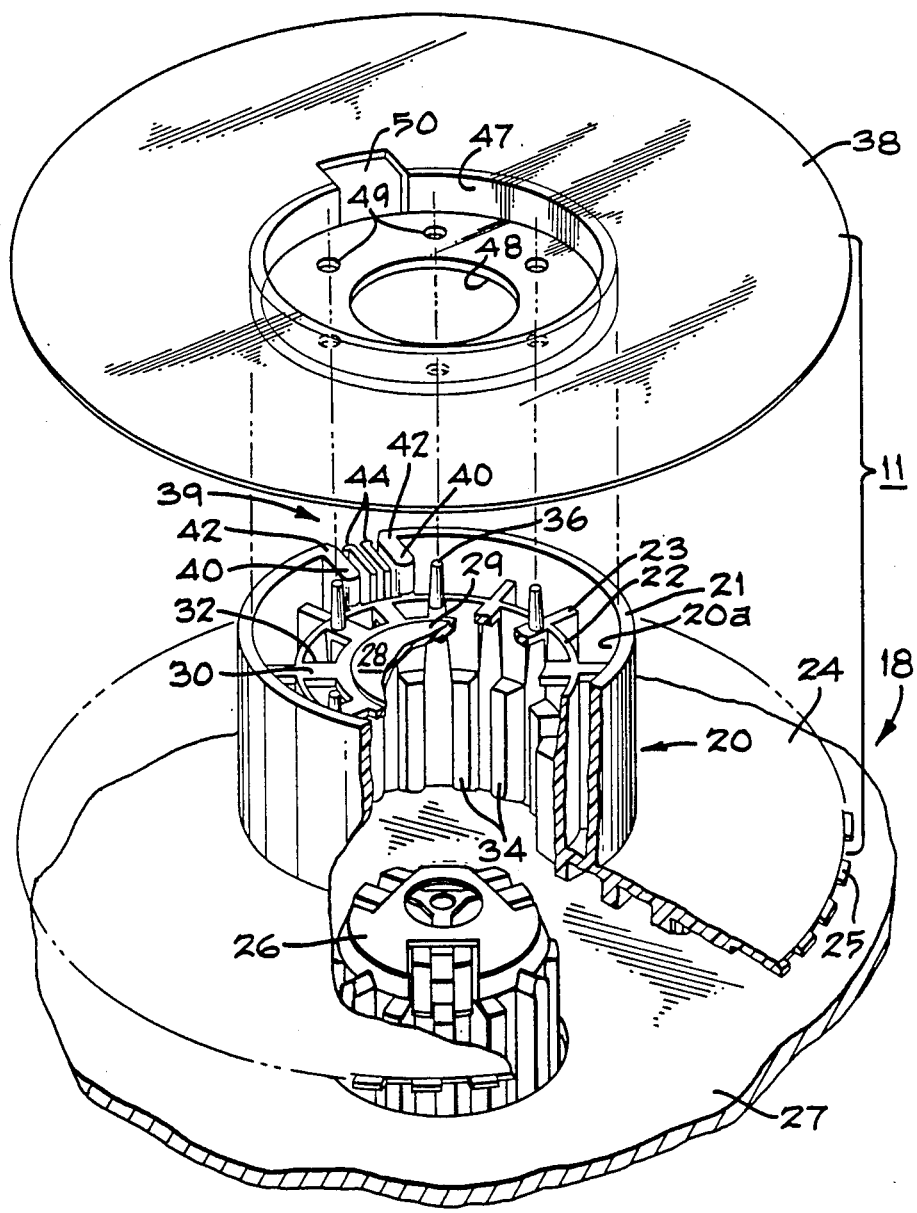
FIG_2

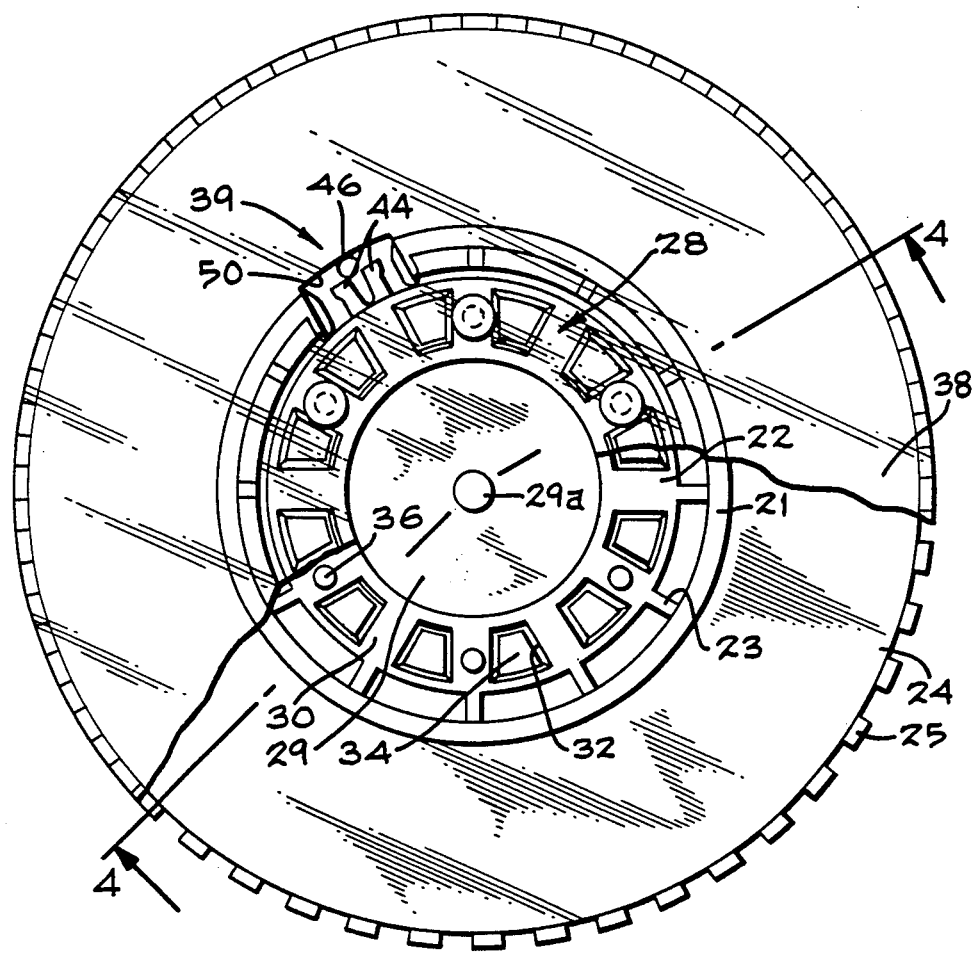
FIG_3
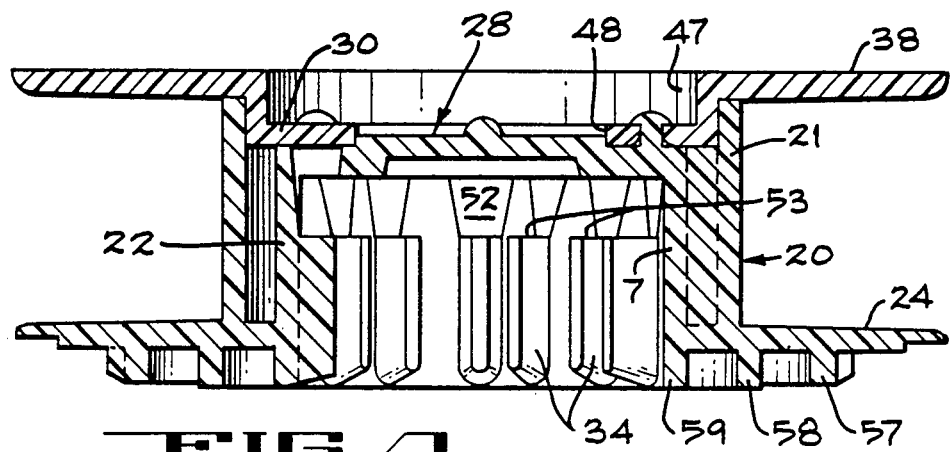
FIG_4

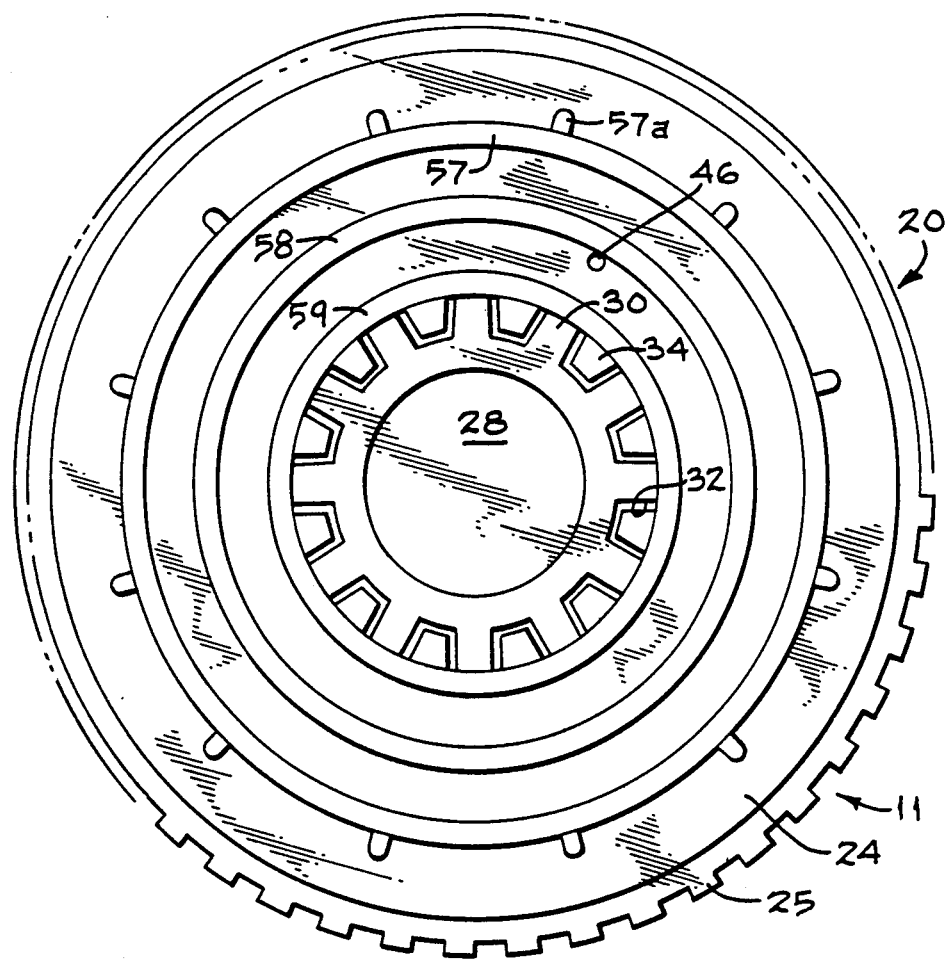
FIG_5
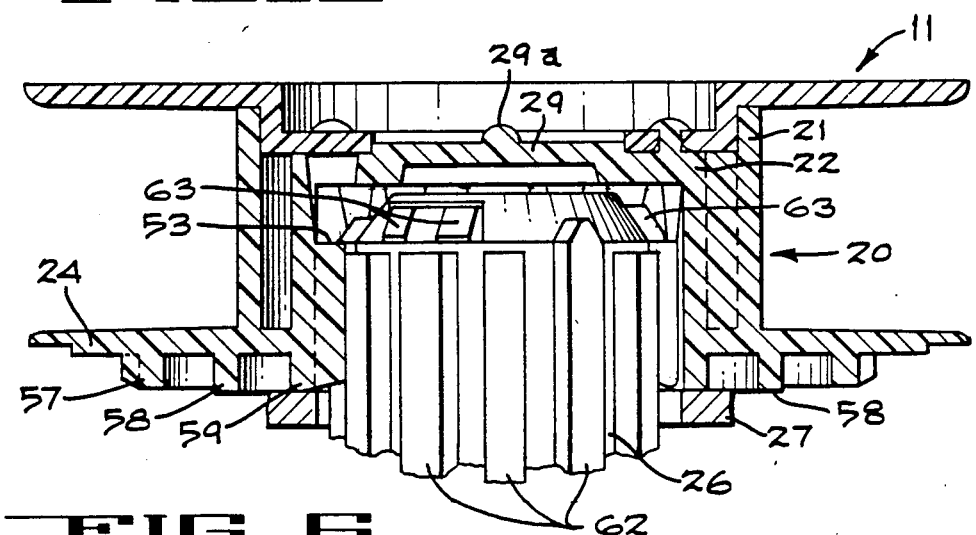
FIG_6

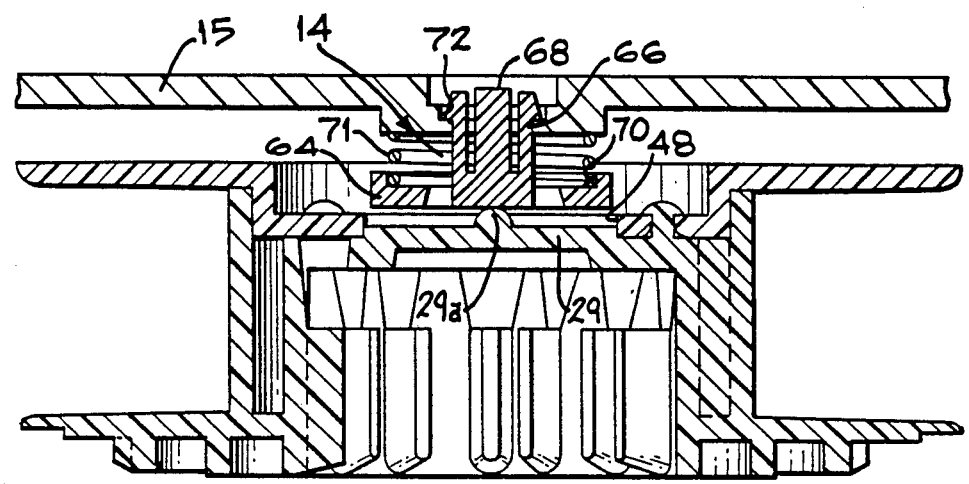
FIG_8
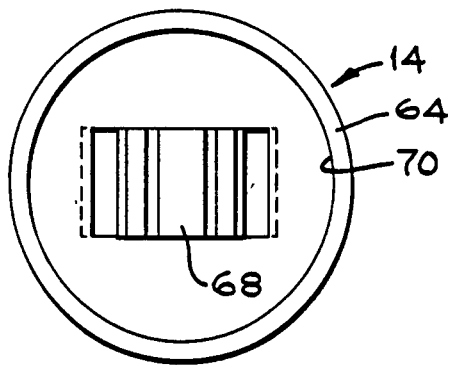
FIG_7C
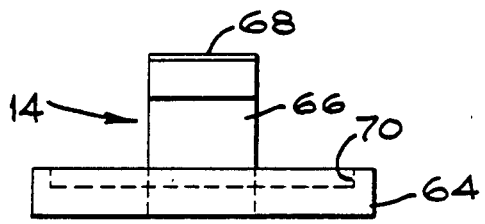
FIG_7A
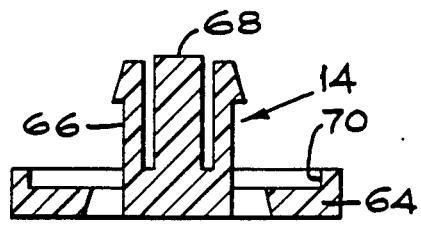
FIG_7B

SINGLE PIECE TAPE REEL AND ASSEMBLY

This invention relates to a magnetic tape cassette for use in a transport of a magnetic tape recorder, and in particular to a tape reel used internal to a tape cassette and cassette assemblies employing same.

A magnetic tape cassette for use in a cassetteable magnetic tape transport generally comprises a plastic housing enclosing a pair of plastic tape reel structures carrying either prerecorded tape for reproduction or blank tape for recording. A rotary bearing interface, springloaded, is often provided between the cassette and the reel to bias the reel at the top plate of the transport mechanism. Most of these tape reels are multipiece structures including a hub upon which tape is wound, and at least one, usually bottom, flange which provides a platform that supports the tape pack wound about the hub. Many reels also include a second, top flange securely fastened to the hub to oppose the bottom flange and cooperate therewith in ensuring the tape is properly retained on the hub and to protect the edges of the tape. The desire to provide a very good bearing material at the bearing interface has led many manufacturers to design separate upper and lower reel pieces. Each piece of the reel is typically manufactured separately by molding techniques, and thereafter assembled to form the reel structure.

Advantages of economy, reliability and ease of manufacture can be gained by reducing the number of pieces that must be manufactured separately and handled for assembly. Molding pieces as a single unit or assemblage is a well recognized technique of achieving such advantages. Such technique has been employed in the manufacture of tape reels. In one such tape reel, a hub whose diameter increases along its axial extent is joined to a flange at one of its ends, which defines an undercut at the hub/flange joint. To enable manufacture by molding as a single piece, the sidewall of the hub is segmented in the direction of its axis to provide hub flexibility that allows the hub to flex inward and clear the mold upon ejection therefrom during manufacture. However, such flexibility is not desirable in a cassette hub structure required to bear forces in the direction of the hub axis, because such segmentation renders the hub unstable through unwanted flexing. Further, such tape segmentation can cause edge damage at the tape/reel interface and jamming and misalignment of the tape pack. Where the alignment of the top bearing and the hub is critical, rigidity of the hub is necessary and an integrated, sturdy structure is most desirable.

One recently developed tape reel requires a hub structure having an integral drive mechanism in the form of splines axially extending part way along the interior surface of a hollow cylindrical hub. Moreover, the end of the hollow hub is required to be closed, which is achieved by a cover fastened proximate to the open end of the hollow hub. The cover also serves to carry a load bearing at its top. The thusly covered hollow hub forms a blind hole, which has radially inward extending recesses defined between the ends of the axially extending splines and cover. Because of the presence of the recesses, the cover and hub/bottom flange pieces have been molded as separate pieces and thereafter joined together as by welding.

However design, manufacture, and use of a reel hub mechanism would offer substantial advantages over known structures if the relatively complex pieces of the cover, hub and bottom flange are manufactured as a single integrated structure. The alignment of the hub mechanism and the top-bearing is critical to the proper operation of the cassette in which the reel is used. Disturbing rotational torques can be generated if the assembly does not form a rotationally stable structure.

Achievement of this is facilitated by forming the hub, flange and bearing carrying cover pieces by molding them together as a single unitary piece. Moreover, it is desired the hub of the reel structure be substantially rigid to withstand the force applied to it by a tape transport drive mechanism to assure maintenance of positive engagement between the reel and the tape transport. A single piece rigid structure is obtained through a special apertured configuration of the bearing carrying piece. More specifically, the bearing carrying piece is formed to have apertures aligned with the truncated splines at the interior of the hub. This construction permits mold cores to pass through the plane of the bearing carrying piece to form the truncated splines and recesses thereabove. Furthermore, in embodiments requiring the hub opening to be closed to prevent debris from entering the tape transport drive mechanism through the hollow hub, the bearing carrying and cover functions are distributed to separate pieces of the reel. The bearing carrying piece is formed as described before, namely, as a specially apertured part of a single piece hub, flange and bearing structure. A separate cover member, advantageously, a second flange of the reel, is formed with a central portion that covers the apertures of the bearing carrying piece when joined to the open end of the hub to cooperate with the bearing carrying piece in closing the open end of the hub against entry by debris.

In addition, it is desirable to provide a non-rotating interface between the cassette and the reel to minimize rotational perturbations of the reel and frictional interaction between the interface and the reel.

The new structure achieves a substantial advantage over known designs; it combines the reel hub, bottom flange and the top bearing carrying cover in a single piece. Further, the cover is not merely mounted on the structure, it is a fixed part of such structure and also co-operates with a top flange piece to protect the transport mechanism from the operating environment. The present invention further provides a novel method of forming a single reel hub/flange/top bearing structure in a manner not previously known. In addition, the reel of the present invention cooperates with a non-rotating transfer bearing interposed between the top cover of the cassette and the reel to provide a rotationally stable interface between the reel and the transport mechanism.

The present one-piece structure includes a hub having an internal, splined drive mechanism and a top bearing. The splined drive mechanism features internal spaces or recesses between the splines of the reel hub and the top bearing structure. Openings are formed in the top bearing during molding to enable truncation of the splines and formation of the recesses between the top bearing and the splines. Such recesses are provided for receiving a mating portion of a rotating spindle of a tape transport drive mechanism to positively engage the splines and retain the reel in positive engagement with the transport.

Further, to prevent debris from entering the transport mechanism, a cover is placed over the top bearing and cooperates therewith to close the openings while leaving the top bearing exposed. In a preferred embodiment, such cover is formed by a top flange received onto engaging pins provided on the top bearing to secure the top flange in a fixed position on the hub by fusing the pins to the cover.

Overlying the top bearing is a transfer bearing. A center stem of the transfer bearing has a rectangular periphery that is received in a mating opening formed in the top wall of the cassette. At one end of the stem, a flat cylindrical flange is provided for engaging the top bearing of the reel. The opposite end of the rectangular stem terminates in a top button bearing exposed for receiving a hold-down member associated with the transport mechanism. Because the transfer bearing is prevented from rotating relative to the hold-down member, rotational instabilities of the reel engaged by the transfer bearing is minimized. Furthermore, the absence of such relative rotation avoids frictional wear of the transfer bearing and mating wall of the cassette that captures the transfer bearing, and the concomitant rotational instability that could result from such frictional wear. A spring is trapped between the top wall of the cassette and the cylindrical flange of the transfer bearing to bias the reel toward the bottom of the cassette, hence, the top plate of the transport mechanism.

BRIEF DESCRIPTION OF THE DRAWINGS

A better understanding of the present invention can be obtained by considering the following detailed description taken together with the accompanying drawings which illustrate a preferred embodiment of the present invention as used in a magnetic tape cassette for a videotape recorder in which:

FIG. 1 is a perspective view of a cassette in which a pair of tape reels employing the present invention are disposed;

FIG. 2 is an exploded perspective view of a tape reel with portions thereof broken away to show the interior of the integrated hub and top bearing structure of the present invention, with portions of an associated tape transport shown therewith;

FIG. 3 is a top plan view of the assembled tape reel of FIG. 2;

FIG. 4 is a section taken along the lines 4—4 of FIG. 2;

FIG. 5 is a bottom plan view of the tape reel of FIG. 2; and

FIG. 6 is a sectional view similar to FIG. 4, in which an actuator associated with a tape transport is shown engaging the reel.

FIG. 7A is a side elevational view of the reel transfer bearing of the present invention.

FIG. 7B is a sectional view similar to the view of FIG. 7A;

FIG. 7C is a top plan view of FIG. 7A; and

FIG. 8 is a sectional view taken along the lines 8—8 of FIG. 1.

DESCRIPTION OF THE PREFERRED EMBODIMENT

Referring first to FIGS. 1, 2, and 3, there is shown a magnetic tape cassette 10 having a housing 13 for retaining a pair of tape reels 11, 12 rotatably supported therein. A reel transfer bearing 14, received in a top wall 15 of the cassette 10, is provided for each of the reels 11, 12 and is spring loaded to bias the reels 11, 12 toward a bottom wall 16 of the cassette housing 13. The reels 11 and 12 are identical, thus only one need be described.

A reel 11 having a construction permitting pieces to be manufactured by molding as a single piece includes a cylindrical hub portion 20 having an exterior cylindrical wall 21 concentric with a somewhat thinner interior cylindrical wall 22, the walls 21 and 22 connected by support ribs 23. The upper surface of interior wall 22 is displaced below the upper surface of the exterior wall 21 to define a recess 20a in the hub portion 20. The double wall construction provides a rigid hub structure. However, the reel of the present invention can be made with a hub of single wall construction. Integral with the hub portion 20 at a lower end thereof is a bottom flange 24 having peripheral teeth 25 which engage a reel lock (not shown).

A top bearing member 28 is formed at an upper end of the interior wall 22 to provide a surface for rotational engagement by the transfer bearing 14 which is engaged by a hold down mechanism of the transport. As will be described further hereinafter, the hub portion 20, and bottom flange 24 are configured to permit formation as a single piece or member 18 by molding. Top bearing member 28 has a main body portion 29 and a central bearing button 29a, both configured to form a part of a cover for the hub portion 20. The top bearing member 28 is connected to the top of interior wall 22 by connecting ribs 30, provided between the main body portion 29 of the top bearing 28 and the interior wall 22 of the hub portion 20, the ribs 30 spaced between peripheral openings 32 formed in top bearing member 28 when the one piece member 18 is molded. The interior of the hub portion 20 is provided with a plurality of splines 34 that extend axially from the flanged end of the hub portion part way towards the bearing end of the hub portion. The splines are distributed about the inner circumference of the hub portion 20 to receive a rotatable splined spindle 26 of a tape transport 27, which provides rotational drive to the reel 11. Because the splines 34 extend only part way along the hub portion 20, i.e., are truncated within the hub portion, recesses 52 are formed between the truncated ends and the bearing member 28. To permit the hub, flange and bearing unit or member 18 to be manufactured as a single piece, the bearing member 28 is formed with apertures or openings 32 aligned with the splines 34 provided on the interior surface of interior wall 22 of the hub portion 20. Permitting formation of openings 32 in the top bearing member 28 allows a mold core to pass through the plane of the bearing member 28 to truncate the splines 34 and form the recesses 52 during manufacture. Although in FIG. 2 the openings 32 overlie the splines 34 in a one to one correspondence, other configurations of an apertured top bearing members permitting the desired one piece construction are possible. For example, a top bearing member having a central portion and three equi-spaced vanes extending to interior wall 22 which is rotationally stable may be substituted for the top bearing member 28.

Provided at an opening in the exterior wall 21 of the hub portion 20 is an indented tape clamp area 39. The tape clamp area 39 is defined by support ribs 40 which connect respective terminal ends 42 of the exterior wall 21 to the interior wall 22. Disposed between the support ribs 40 are a pair of upright clamping ribs 44 lying adjacent interior wall 22. The ribs 40 and 44 are coterminal with the exterior wall 21 and thus extend above the upper surface of top bearing 28 as seen in FIG. 2.

The tape clamp area 39 functions as follows. A tape segment (not shown) is secured on the reel 11 by laying one end of the tape segment over the tape clamp area 39 and, using a tape clamp rod (not shown) forcing a portion of the tape segment between the clamping ribs 44. In the clamped position, the tape clamp rod is positioned between the clamping ribs 44 with the portion of the tape segment interlaced therebetween. An opening 46 is provided in the bottom flange 24 beneath the spacing between clamping ribs 44 to permit insertion of a tool for releasing the tape clamp rod.

In accordance with another feature of the present invention, a top flange 38 having a stepped portion or collar 47 about a recessed bottom well is fastened to the hub portion 20 near its end having the top bearing member 28. As will be described further hereinafter, the bottom wall is configured to cooperate with the unapertured part of the bearing member 28 to cover the hollow hub portion 20 and prevent debris from passing into the hollow hub portion. Cover openings 49 are provided in the bottom wall of the collar 47 and generally conform to, and correspond with, the pins 36 formed on the ribs 30. The pins serve to fasten the top flange 38 to the hub portion 20 by fusing them to the top flange. An opening 50 corresponds to the tape clamp area 39 provided on the side of the hub portion 20. The collar 47 of the top flange 38 drops into the recess 20a of hub portion 20 to mount on the pins 36, with the opening 50 overlying the tape clamp area 39 and the unapertured portions of the bottom of the collar 47 overlying the holes 32. In this manner, the top flange 38 and top bearing member 20 are configured to cooperate in the closing of the upper end of the hub portion 20, thereby preventing potentially harmful debris from being drawn into the transport drive mechanism area through the holes 32.

The splines 34 can better be seen in FIG. 4, where it is to be noted that each of the splines 34 are located on the interior wall 22 of the hub portion 20 and extend axially from a first end located proximate a lower end of the hub portion 20 and terminate at a second end displaced inwardly from an upper end of the hub portion 20. The splines 34 are truncated by molding cores included in the molding tooling that are permitted to pass through the plane of the bearing member 28 by virtue of allowing the formation of openings 32 in the top bearing member 28 during the manufacturing process of the one-piece member 18. The truncation of the splines 34 defines the series of recesses 52 between each of the truncated upper ends 53 of the splines 34 and the top bearing member 28.

FIG. 5 illustrates the bottom of the reel 11, or more precisely, the bottom of the hub portion 20 and the flange 24 attached thereto. The cassette 10/reel 11 interface includes the peripheral teeth 25 of the flange 24 which engage a reel-lock provided in the cassette 10. Inward of the toothed periphery of the reel 11 are provided a series of rings 57, 58, 59 which are concentric with the hub portion 20. The ring 57 lies inward of the periphery of the flange 24 and has mounted thereon a series of equally spaced projections 57a which locate the reel 11 in the bottom wall 16 of the cassette 10. The ring 58 is inward of the ring 57 and serves as a locator for the reel 11 on an intersecting face of the transport 27. In FIG. 5 the opening 46 to the tape clamp area 39 is shown adjacent the ring 58. The ring 59 engages the lower ends of splines 34 to define another interface of the cassette 10 and the tape transport 27.

In FIG. 6, the cassette 10 and tape transport 27 interface is shown in greater detail. The spindle 26 of the tape transport 27 has axial splines 62 complementary to splines 34 provided about the interior of the interior wall 22 of the hub portion 20 of the reel 11. As the cassette 10 descends, the reel 11 engages splines 62 and seats on the spindle 26. At the top of the spindle 26 are provided three pneumatically driven extensible reel clamping fingers 63 located at 120° intervals circumferentially about the spindle. The fingers 63 are driven outwardly into the recesses 52 of the one-piece member 18 to overlay the splines 34 and engage the upper truncated portions 53 thereof when the reel 11 is seated on the spindle 26. The splines 62 and downward pressure applied to the splines 34 by the fingers 63 of the spindle 26 assure proper secure mounting rotation of the reel 11.

The transfer bearing 14 is shown in detail in FIGS. 7 and 8. As shown in FIGS. 7A, 7B, 7C, the transfer bearing 14 comprises a flat, cylindrical bottom flange 64 secured to a central stem 66 which terminates in a top button bearing 68. A concentric recess 70 is provided in the flange 64. The central stem 66 and top button bearing 68 is rectangular, for insertion into a mating rectangular aperture 72 formed in the top wall 15 of the housing 13. This serves to trap the transfer bearing 14 between the top wall 15 and the reel 11 and prevent relative rotation therebetween. The transfer bearing 14 is also prevented from rotating relative to its associated hold-down member, to minimize rotational instabilities of the reel 11 engaged by the transfer bearing 14. Furthermore, the absence of such relative rotation avoids frictional wear of the transfer bearing 14 and mating wall 15 of the cassette 10 that captures the transfer bearing 14, and the concomitant rotational instability that could result from such frictional wear. Any interface of non-circular design could be employed to prevent such rotation. Generally, providing a flat surface portion along the central stem and a mating flat about the circumference of aperture 72 will accomplish this. The top button bearing 68 is split as shown in FIG. 7B to facilitate insertion into the aperture 72. A partial sectional view of the cassette 10, as shown in FIG. 8, reveals that the transfer bearing 14 is received in a central opening 48 of the top flange 38, with the bearing surface of the bottom flange 64 engaging the central bearing button 29A of top bearing surface 29. A spring 71, axially aligned with the stem 66, seats in the recess 70. The top button 68 is received in the top wall 15 of the cassette 10 in the mating rectangular aperture 72. The spring 71 overlies the stem 66 and is trapped between the top wall 15 and the bearing 14 to bias the reel 11 toward the top plate of the associated tape transport mechanism 27.

The one-piece member 18 with its series of recesses 52 for the reel clamping fingers 63 carried by the spindle 26 is formed by molding, with suitable cores in the mold forming the openings 32 and truncating the splines 34 at the upper ends 53 as shown in FIG. 4.

The present invention provides a reel hub 20, a bottom flange 24 and a top bearing member 28 formed as a one-piece member 18 to achieve a consistent alignment and rotational stability therebetween not previously known. Also, provided with the one-piece member 18 is a novel cover 38 which cooperates with the apertured top bearing member to prevent debris normally associated with the cassette/transport environment from entering the transport drive mechanism. A novel reel transfer bearing 14 captures the reel 11 within the cassette 10 and provides a rectangular interface between the bearing and the cassette housing which prevents rotation of the bearing 14 while permitting rotation of the reel 11 within the cassette housing.

Having described the preferred embodiment of the present invention it is understood that such invention is not limited to the above description and that various changes and modifications may be made therein without affecting the scope and contents thereof. Such scope is to be defined only by the appended claims.

I claim:

1. A reel for storage of magnetic tape adapted to be mounted on a rotatable splined spindle of a magnetic tape recording apparatus comprising:
   a one piece hub member including a hub having a central hub portion, an attached flange, and an integral top cover portion, the hub portion having a central opening;
   a plurality of splines circumferentially disposed about and extending axially along the interior of the central opening of the hub portion in spaced relation for engaging the spindle;
   the top cover portion overlying the central opening, and having access opening therein overlying the splines; and
   said splines being truncated at respective upper ends thereof adjacent the top cover portion, to define a series of recesses between the top cover portion and respective upper surfaces of the splines, concentric with the central opening for receiving an engaging member of the spindle.

2. A reel as claimed in claim 1 wherein a reel flange portion is mounted on an engaging means of the top cover portion to close the hub portion of the reel.

3. A reel as claimed in claim 2 wherein the engaging means comprise means provided on the hub portion for aligning the rell flange portion on the hub portion and a series of engaging pins mounted on the top cover portion, said pins and said alignment means received into corresponding openings provided in the reel flange portion to align the reel flange portion on the hub portion.

4. A reel for storage of magnetic tape adapted to be mounted on a rotatable splindle of a magnetic tape recording apparatus comprising:
   a one-piece hub member including a hub having a central hub portion, an attached flange, and an integral top cover portion the hub portion having a central opening;
   a plurality of splines circumferentially disposed about the extending axially along the interior of the central opening of the hub portion in spaced relation for engaging the spindle;
   the top cover overlying the central opening and having access openings therein overlying the splines;
   said splines being truncated at the upper ends thereof to define a series of recesses between the top cover and the splines, concentric with the central opening, for receiving an engaging member of the spindle;
   a reel flange portion mountable on the hub portion and overlying the access openings of the top cover portion member; and
   means for engaging the reel flange portion provided on the top cover portion comprising means provided on the hub portion for aligning the reel flange portion on the hub portion and a series of engaging members mounted on the top cover portion, said engaging members and said alignment means received into corresponding openings provided in the reel flange portion to close the hub portion.

5. A reel for storage of magnetic tape adapted to be mounted on a rotatable splined spindle of a magnetic tape apparatus, comprising:
   a unitary plastic hub and flange member including a hub part, flange part and hub cover part joined by molding as a single piece;
   said hub part including a cylindrical part defining a hollow cylindrical interior, said cylindrical part extending along an axis between opposite ends of said hub for receiving the splined spindle, and a plurality of splines circumferentially disposed about and extending axially along said hub's interior surface for engaging the splined spindle upon insertion within the hub, each spline extending from a first end thereof located proximate a first of said opposite hub ends towards and terminating at a second end thereof displaced axially inward from a second of said opposite hub ends;
   said flange part being circular and joined to said hub proximate said first end of said hub to radially extend outward from said hub, said flange having a surface facing the second end of said hub for engaging magnetic tape wound about said hub; and
   said hub cover part joined to said hub proximate said second end of said hub spaced axially from the second ends of splines, said hub cover defining a plurality of apertures distributed about said hub cover and axially aligned with the splines so that the second ends thereof are uncovered by said hub cover.

6. The reel according to claim 5 wherein said hub cover part has a number of apertures corresponding to the number of splines of said hub part, said apertures axially aligned with said splines.

7. The reel according to claim 5 further comprising second circular flange having a connecting piece for attaching said second flange to the hub part at the second end of said hub to radially extend outward therefrom, said second flange having a surface facing the first end of said hub for engaging magnetic tape wound about said hub, and said second flange having a central portion overlying the hub cover part to cover the apertures defined by said hub cover.

8. The reel according to claim 7 wherein said hub cover part has a number of apertures corresponding to the number of splines of said hub part, said apertures axially aligned with said splines.

9. The reel according to claim 8 wherein the connecting piece of the second flange is a circular collar inserted within the interior of the hub part, and said central part of the second flange is at an end of said collar facing the hub cover part.

10. The reel according to claim 9 wherein the central part of the second flange is seated against the hub cover part to close the apertures defined thereby.

11. A tape cassette insertable into a tape transport means having a reel for holding a supply of tape at a supply position for transport to a reel at a take-up position, the cassette comprising:
   a housing having a top wall and associated side walls defining an interior for rotatably supporting at least one reel therein and having a wall portion defining an opening permitting withdrawal of tape therefrom;

biasing means provided between each of the cassette reels and the top wall of the cassette, each of the biasing means mounted to engage both the top wall of the cassette and the reel, said mounting to prevent rotation of said means; and a reel including a one-piece member having a hub having a central hub portion, an attached flange, and an integral top cover portion, the hub portion having a central opening;

a plurality of splines circumferentially disposed about and extending axially along the interior of the central opening of the hub portion in spaced relation for engaging the spindle;

the top cover portion overlying the central opening and having access openings therein overlying the splines; and said splines truncated at the upper ends thereof to define a series of recesses between the top cover portion and the splines, concentric with the central opening for receiving an engaging member of the spindle.

12. A tape cassette insertable into a tape transport means having a reel for holding a supply of tape at a supply position for transport to a reel at a take-up position, the cassette comprising:

a bottom wall, a top wall and associated side walls in assembled relation;

biasing means provided between each of the cassette reels and the top wall of the cassette, each of the biasing means mounted to engage both the top wall of the cassette and the reel, said mounting to prevent rotation of said means; and a unitary plastic hub and flange member including a hub part, flange part and hub cover part joined by molding as a single piece;

said hub part including a cylindrical part defining a hollow cylindrical interior, said cylindrical part extending along an axis between opposite ends of the hub for receiving the splined splindle, and a plurality of splines circumferentially disposed about and extending axially along said hub's interior surface for engaging the splined spindle upon insertion within the hub, each spline extending from a first end thereof located proximate a first of said opposite hub ends towards and terminating at a second end thereof displaced axially inward form a second of said opposite hub ends;

said flange part circular and joined to said hub proximate said first end of said hub to radially extend outward from said hub, said flange having a surface facing the second end of said hub for engaging magnetic tape wound about said hub; and said hub cover part joined to said hub proximate said second end of sid hub spaced axially from the second ends of splines, said hub cover defining a plurality of apertures distributed about said hub cover and axially aligned with the splines so that the second ends thereof are uncovered by said hub cover.

* * * * *

UNITED STATES PATENT AND TRADEMARK OFFICE
CERTIFICATE OF CORRECTION

PATENT NO. : 4,715,558

DATED : December 29, 1987

INVENTOR(S) : Kenneth E. Fair et al

It is certified that error appears in the above-identified patent and that said Letters Patent is hereby corrected as shown below:

Column 7, line 36, change "rell" to --reel--;
         line 43, after "rotatable" insert --splined--;
Column 8, line 38, after "comprising" insert --a--;
Column 10, line 24, delete "sid" insert --said--.

Signed and Sealed this

Sixteenth Day of August, 1988

Attest:

DONALD J. QUIGG

Attesting Officer    Commissioner of Patents and Trademarks